US009004570B1

(12) United States Patent
Krishnan et al.

(10) Patent No.: US 9,004,570 B1

(45) Date of Patent: Apr. 14, 2015

(54) ADJUSTABLE LATCH ASSEMBLY

(71) Applicant: Ford Global Technologies, LLC, Dearborn, MI (US)

(72) Inventors: Venkatesh Krishnan, Canton, MI (US); Bhupendra A. Patel, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/223,444

(22) Filed: Mar. 24, 2014

(51) Int. Cl.

*B62D 25/10* (2006.01)
*E05B 83/18* (2014.01)
*E05B 85/04* (2014.01)

(52) U.S. Cl.

CPC ................. *E05B 83/18* (2013.01); *E05B 85/04* (2013.01)

(58) Field of Classification Search

USPC ............... 296/76; 70/277; 292/340, 201, 216, 292/341.16, DIG. 43, DIG. 23

See application file for complete search history.

(56) References Cited

U.S. PATENT DOCUMENTS 5,938,253 A * 8/1999 Szablewski et al. .......... 292/216
6,176,528 B1 1/2001 Taga
6,773,043 B2 * 8/2004 Taga ........................ 292/341.16

FOREIGN PATENT DOCUMENTS

| | | |
|---|---|---|
| JP | 05085429 | 4/1993 |
| JP | 20040360457 | 12/2004 |
| KR | 20050070848 | 7/2005 |
| KR | 100858192 B1 | 9/2008 |

* cited by examiner

*Primary Examiner* — Lori L Lyjak

(74) *Attorney, Agent, or Firm* — Raymond Coppiellie; Price Heneveld LLP

(57) ABSTRACT

A method of setting a gap or margin between an edge of a decklid and a vehicle surface includes providing a powered cinching latch assembly including a powered actuator that moves a striker member between a presented position and a fully cinched position. The cinched position of the striker is adjusted to provide an acceptable gap or margin between an edge of the decklid and an adjacent vehicle surface.

17 Claims, 8 Drawing Sheets

Switch logic state

| | Striker Position | | |
|---|---|---|---|
| | Presented | Mid | Cinched |
| Switch A | Open | Open | Closed |
| Switch B | Closed | Open | Open |

ADJUSTABLE LATCH ASSEMBLY

FIELD OF THE INVENTION

The present invention generally relates to motor vehicles, and particularly, to an adjustable latch for decklids and the like that provides for improved gaps between the decklid and adjacent vehicle surfaces.

BACKGROUND OF THE INVENTION

Motor vehicles may include a decklid that is retained in a closed position by a latch. When the decklid is in a closed position, a margin or gap is formed between the decklid and adjacent vehicle surfaces. If the gap is too large, or if the gap is significantly larger in some areas than in other areas, the gap may be too large or inconsistent to provide a desired appearance.

SUMMARY OF THE INVENTION

One aspect of the present invention is an adjustable latch assembly for vehicles of the type having a decklid that selectively closes off a deck opening. The decklid includes a latch mechanism having a movable latch member configured to releasably engage a striker to connect the decklid to a striker. An adjustable striker assembly is configured to be mounted to a vehicle adjacent the deck opening of the vehicle. The adjustable striker assembly includes a support structure and a striker member that is movably mounted to the support structure for movement relative to the support structure between a presented position and a fully cinched position. The striker member is configured to retain the decklid in a partially closed position relative to the deck opening when the striker member is in the presented position. The striker member is configured to retain the decklid in a fully closed position when the striker member is in the fully cinched position. A powered actuator is operably connected to the striker member to provide powered movement of the striker member from the presented position to the fully cinched position. The fully cinched position of the striker member is adjustable such that the fully closed position of the decklid relative to a decklid opening can be adjusted. Specifically, the fully closed position of the decklid can be adjusted to provide a predefined gap between an edge of the decklid and an adjacent vehicle structure.

Another aspect of the present invention is a method of setting a gap between a decklid and a vehicle surface. The method includes providing a powered cinching latch assembly including a releasable latch mechanism and a striker assembly. The striker assembly includes a powered actuator that moves a striker member between a presented position and a cinched position. The method includes adjusting a location of the cinched position of the striker member to provide a gap between an edge of the decklid and an adjacent vehicle surface that is acceptable according to predefined criteria.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Figure 1:
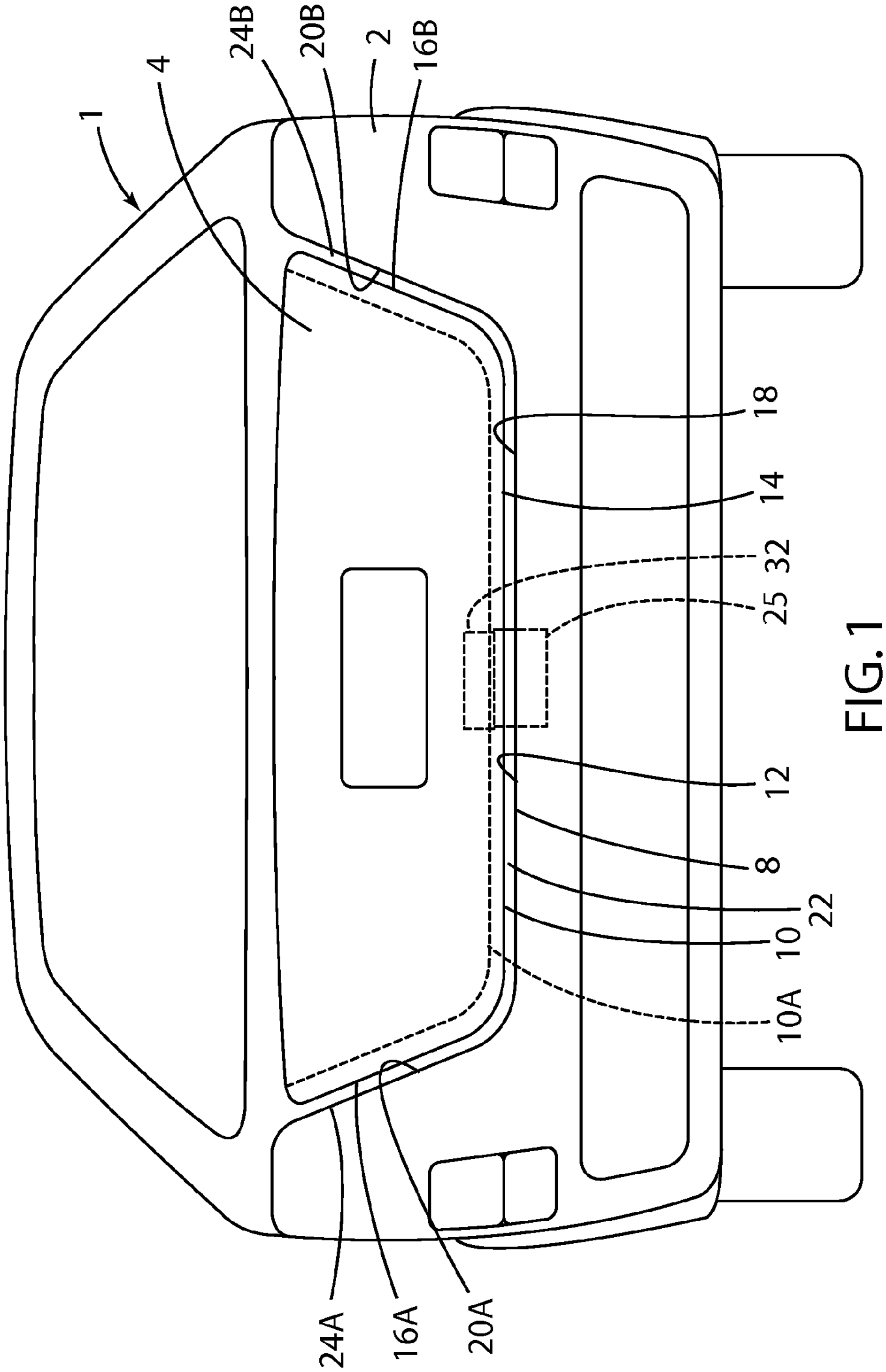
FIG. 1 is a rear elevational view of a motor vehicle.

For purposes of description herein, the terms “upper,” “lower,” “right,” “left,” “rear,” “front,” “vertical,” “horizontal,” and derivatives thereof shall relate to the invention as oriented in FIG. 1. However, it is to be understood that the invention may assume various alternative orientations and step sequences, except where expressly specified to the contrary. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

With reference to FIG. 1, a motor vehicle 1 includes a vehicle structure 2 and a decklid 4 that is movably mounted to the vehicle structure 2 for pivoting movement between open and closed positions. A latch 32 on decklid 4 engages an adjustable striker assembly 25 to releasably retain the decklid 4 in a closed position. The decklid 4 includes a lower/rear edge 10 that is spaced apart from an adjacent vehicle surface 12 to define a margin or gap 8. The edge 10 of decklid 4 may include a generally horizontal lower edge portion 14 and upwardly extending edge portions 16A and 16B that are spaced apart from corresponding vehicle surfaces 18 and 20A, 20B, respectively, to form an elongated lower gap 22 and side gaps 24A and 24B. However, the shape of the edges of decklid 4 and corresponding vehicles surfaces may vary, and the present invention is not limited to the specific configuration of FIG. 1.

Figure 2:
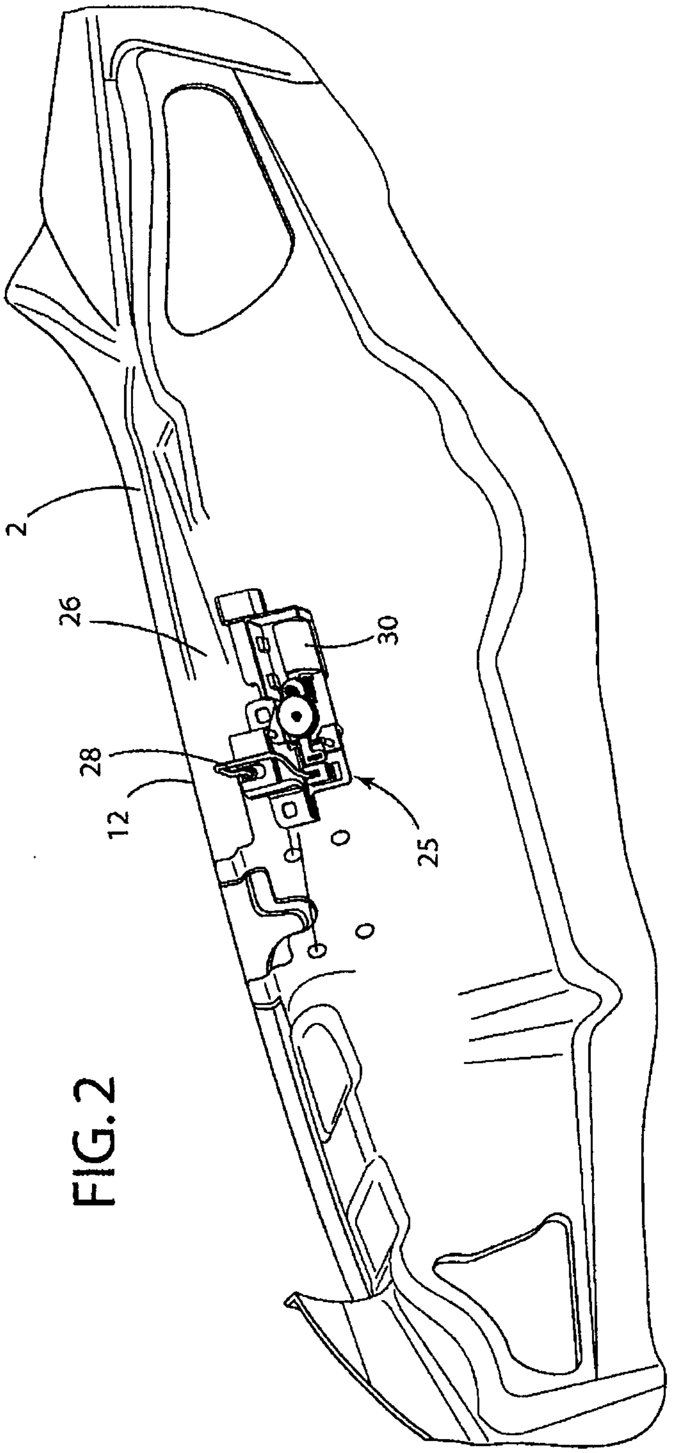
FIG. 2 is a partially fragmentary view of a portion of a vehicle interior showing an adjustable powered cinching striker assembly mounted to the vehicle structure.

With further reference to FIG. 2, adjustable cinching striker assembly 25 is mounted to an inner portion 26 of the vehicle structure 2. The adjustable striker assembly 25 includes an electric motor 30 or other suitable powered actuator that moves a striker member 28 in a generally vertical direction as indicated by the arrow “A” (FIG. 3) between a fully cinched position “C” and an extended or presented position “P.” In use, the electric motor 30 drives the movable striker member 28 to the presented position P when the decklid 4 is opened. To close the decklid 4, a user can move the decklid 4 down towards a closed position, causing a latch member (not shown) of latch 32 mounted on decklid 4 to engage the striker 28 in a known manner, initially retaining the decklid 4 in a presented or partially closed position. When the decklid 4 is in the presented position, the edge 10 is in a position shown by the dashed line 10A. The electric motor 30 then causes the striker member 28 to move from the presented position P to the fully cinched position C (FIG. 3), thereby moving the decklid 4 to a fully closed position. The latch 32 of decklid 4 may comprise a conventional latch of a known type utilized in decklids of motor vehicles. Also, it will be understood that cinching striker assemblies that move decklids from presented positions to fully cinched (closed) positions are known in the art.

Figures 3, 4:
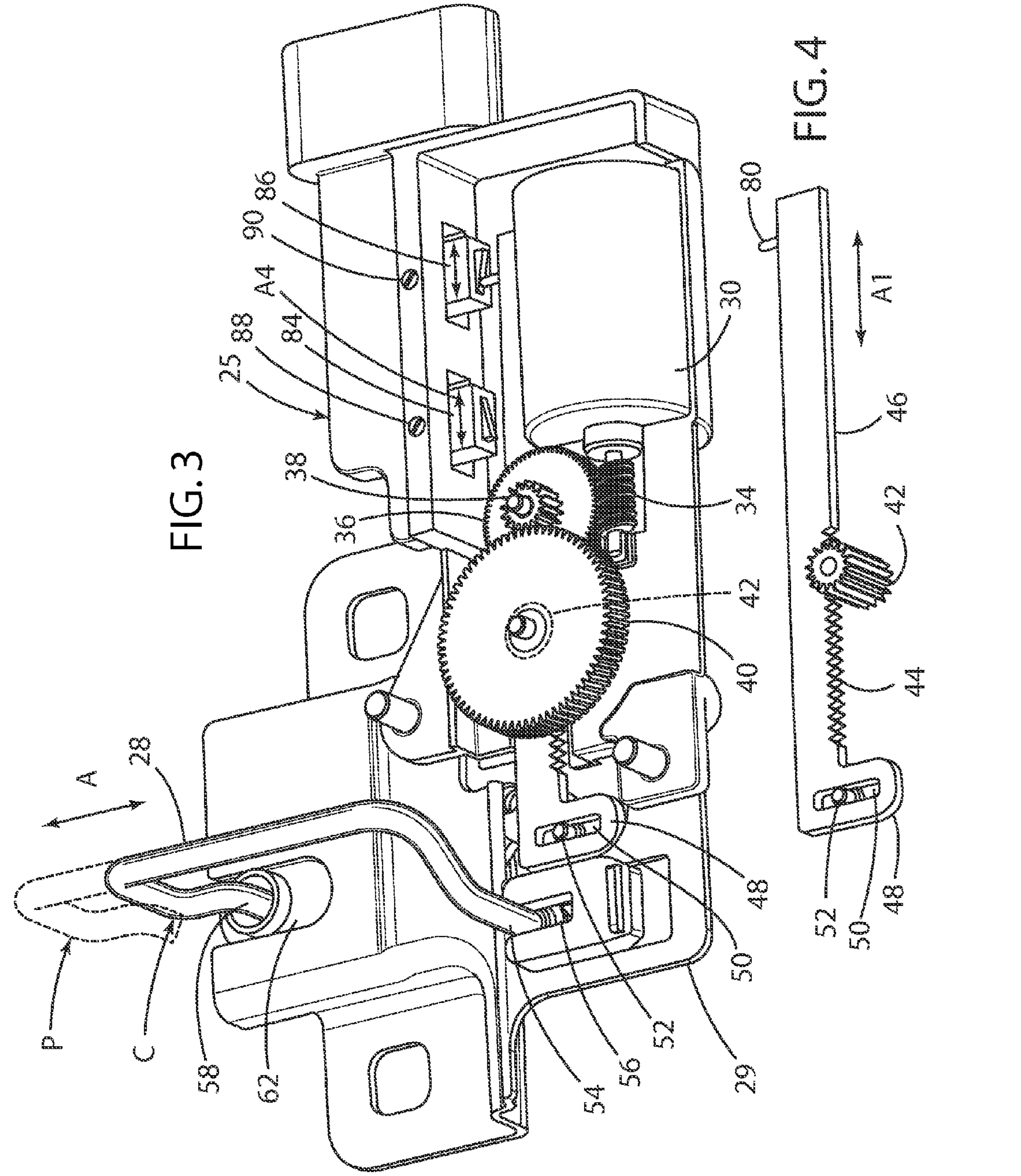
FIG. 3 is an isometric view of an adjustable powered cinching striker assembly.
FIG. 4 is an isometric view of a rack and gear of the powered cinching adjustable striker assembly of FIG. 3.

With reference to FIG. 3, the electric motor 30 drives a worm gear 34, thereby rotating a first gear 36 and a second gear 38. Second gear 38 engages a third gear 40, thereby driving a fourth gear 42. With further reference to FIG. 4, fourth gear 42 engages teeth 44 of rack member 46, thereby linearly shifting the rack member 46 as shown by the arrow A1 upon actuation of electric motor 30. End 48 of rack member 46 includes a slot 50 that receives a pin 52.

Referring again to FIG. 3, striker member 28 includes a lower end 54 that is movably connected to support structure 29 by a first vertical slide assembly 56. Upper end 58 of movable striker member 28 is movably interconnected with striker structure 29 by a second slide assembly 62 such that the movable striker member is constrained and moves in a reciprocating vertical motion relative to the structure 29 of adjustable striker assembly 25.

Figure 5:
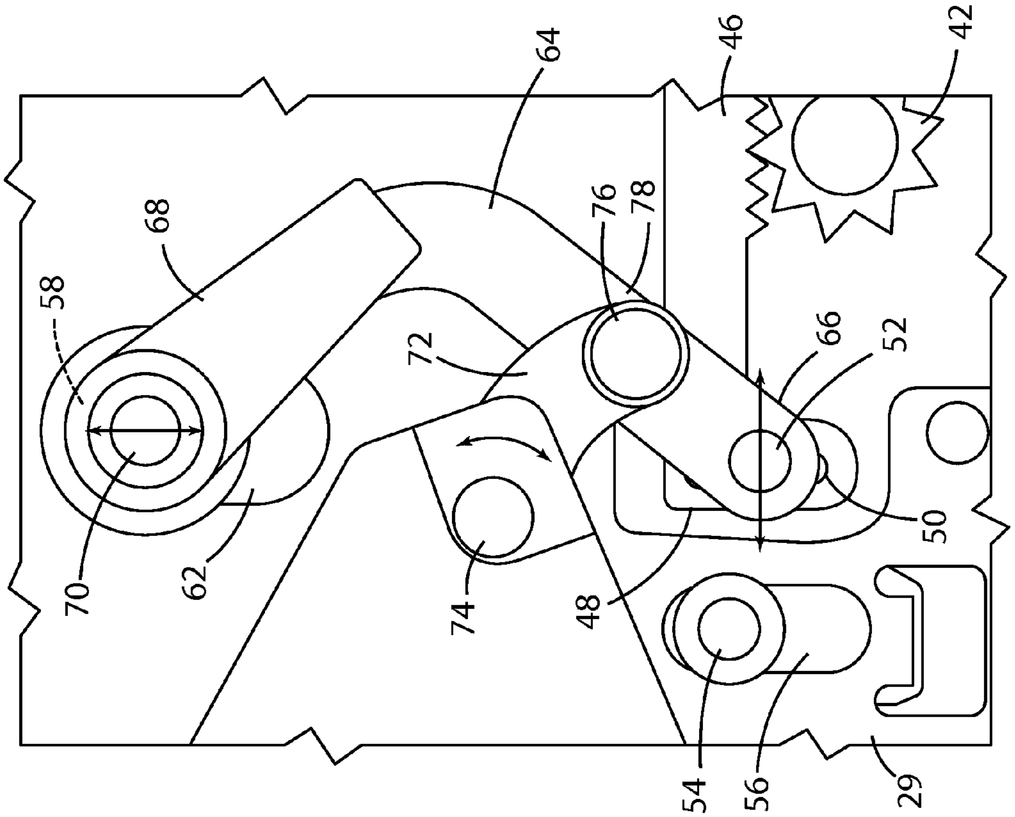
FIG. 5 is an enlarged, fragmentary view of a linkage of the powered cinching adjustable striker assembly of FIG. 3.

With further reference to FIG. 5, a first link 64 has a lower end 66 that is pivotably connected to rack 46 by pin 52, and an upper end 68 including a pivotable connector 70 that pivotably connects the upper end 58 of movably striker member 28 to the first link 64. A second link 72 includes a first end 74 that is pivotably mounted to the structure 29, and a second end 76 that is pivotably connected to an intermediate portion 78 of first link 64.

Figure 6:
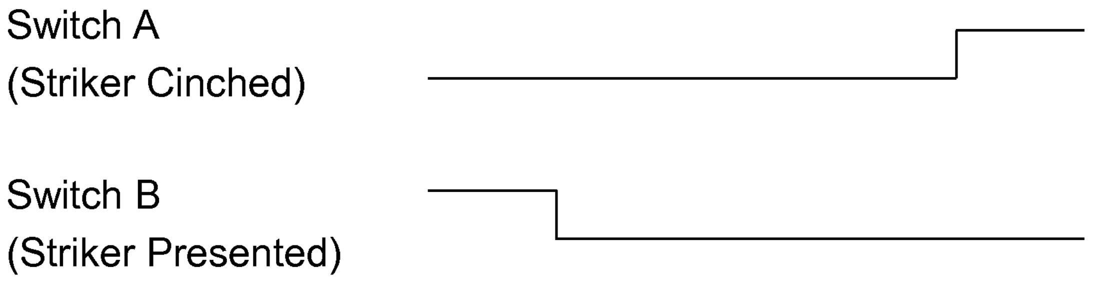
FIG. 6 shows the switch logic states of the powered cinching adjustable striker assembly of FIG. 3.

Actuation of electric motor 30 causes rack member 46 to shift linearly as discussed above in connection with FIGS. 3 and 4. Movement of rack member 46 causes first and second links 64 and 72 to rotate, thereby causing movable striker member 28 to shift in the direction of the arrow “A” (FIG. 3) between the fully cinched position C and the presented position P. With reference to FIGS. 3 and 4, rack member 46 may include a protrusion 80 that engages first and second switches 84 and 86 when the rack member 46 shifts linearly as shown by arrow A1. The switches 84 and 86 correspond to the presented and fully cinched positions of movable striker member 28. The first and second switches 84 and 86 may be connected to a controller (not shown) or other control logic arrangement such that the position of the striker member 28 can be determined. With reference to FIG. 5, the first switch 84 (“Switch A” in FIG. 6) is actuated when the striker member 28 is in a fully cinched position C. The second switch 86 (“Switch B” in FIG. 6) is actuated when the movable striker member 28 is in the presented position P.

Figure 7:
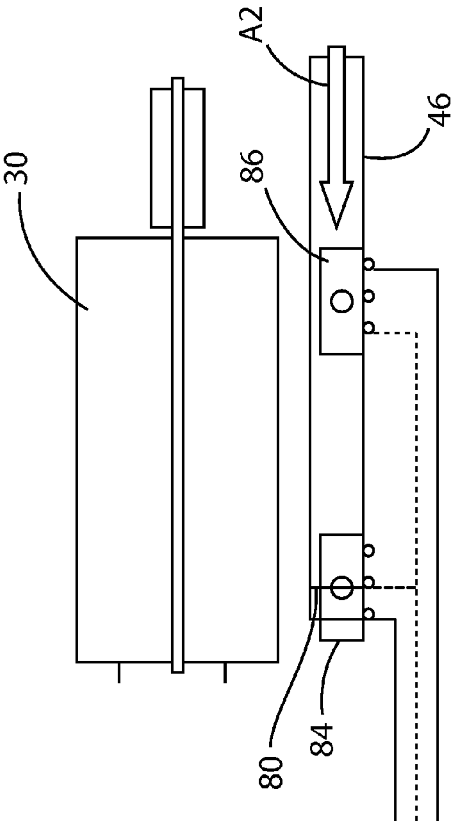
FIG. 7 is a partially schematic view showing operation of the powered cinching adjustable striker assembly of FIG. 3.
Figure 8:
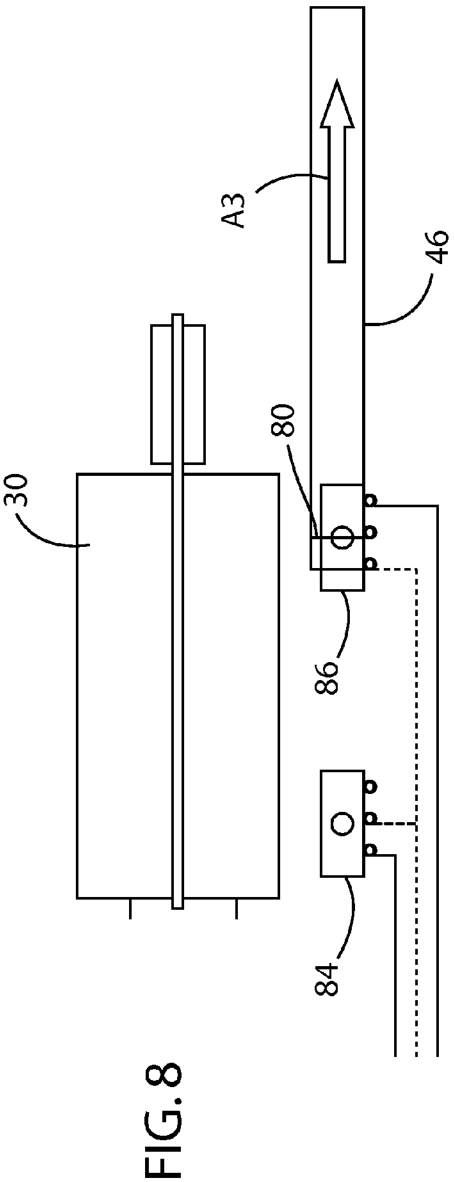
FIG. 8 is a partially schematic view showing operation of the powered cinching adjustable striker assembly of FIG. 3.

Operation of the electric motor 30, rack 46, and switches 84 and 86 is shown schematically in FIGS. 7 and 8. Specifically, with reference to FIG. 7, when the movable striker member 28 is in the presented position P, the electric motor 30 drives the rack 46 in the direction of the arrow A2 such that the protrusion 80 of rack 46 engages first switch 84. The protrusion 80 is represented schematically as a line in FIGS. 7 and 8. It will be understood that various features other than a protrusion may be utilized to actuate switches 84 and 86. Furthermore, virtually any type of switch or other suitable device that is capable of providing information concerning the position of rack member 46 and/or movable striker member 28 may be utilized, and switches 84 and 86 are merely an example of a preferred embodiment. With reference to FIG. 8, when the electric motor 30 drives the rack 46 in the direction of the arrow A3, the movable striker member 28 is moved to the cinched position C (FIG. 3) and the protrusion 80 actuates switch 86. In general, electric motor 30 may be configured to move rack 46 in the direction of the arrow A2 (FIG. 7) until switch 84 is actuated when striker member 28 is being moved to the presented position P, and electric motor 30 may drive rack member 46 in the direction of the arrow A3 when moving the striker member 28 to the fully cinched position C until the protrusion 80 actuates switch 86. Control of electric motor 30 may be accomplished by utilizing a programmable controller, electrical circuit, or other suitable means.

Referring again to FIG. 3, the switches 84 and 86 may be adjustably mounted to the support structure 29. Set screws 88 and 90 or other locking or retaining arrangements may be utilized to retain the switches 84 and/or 86 in a desired position. Specifically, the position of first switch 84 may be adjusted as shown by the arrow A4. Changing the position of switch 84 changes the position of movable striker member 28 when it is in the fully cinched position C. Because the location of the striker member 28 in the cinched position C determines the size of the lower portion 22 of gap 10 (FIG. 1) between the decklid 4 and the adjacent vehicle surface 18, the position of first switch 84 can be adjusted to provide a desired gap 8 when decklid 4 is in a closed position.

Figure 9:
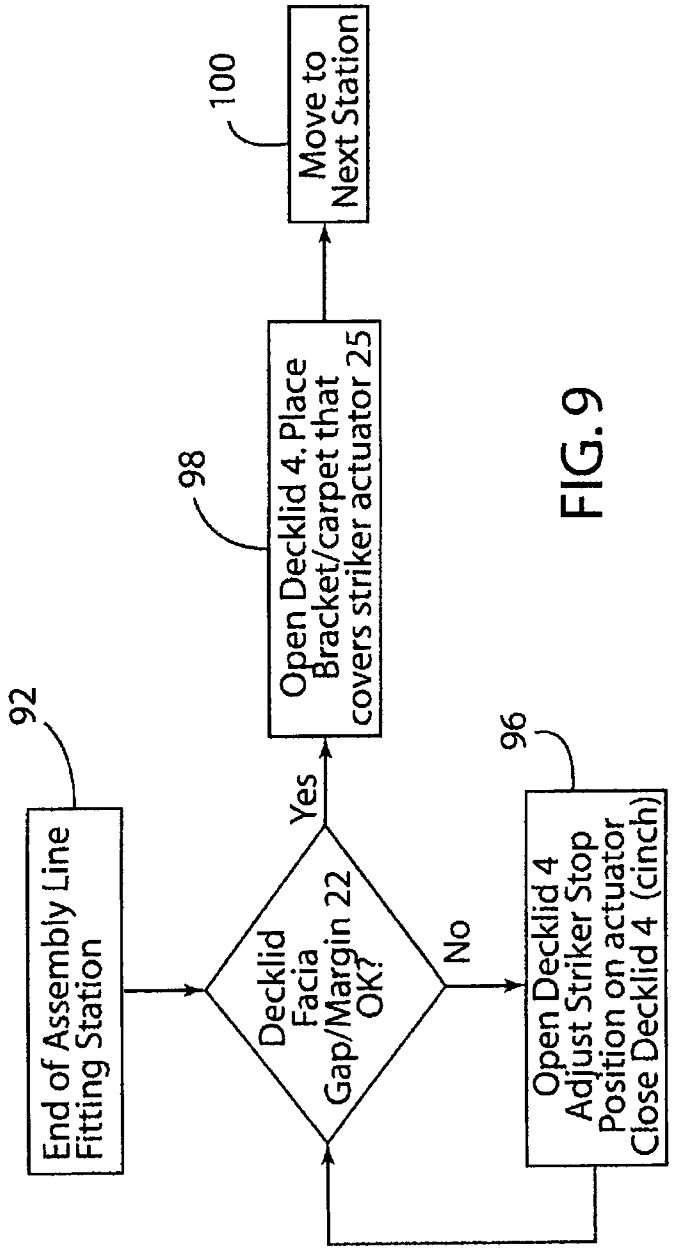
FIG. 9 is a flow chart showing a method of adjusting a gap or margin between an edge of a decklid and a vehicle structure.

With further reference to FIG. 9, during assembly of motor vehicle 1 the motor vehicle 1 is positioned at a fitting station at the end of an assembly line as indicated at step 92. A worker can then measure or otherwise check the gap or margin 22 between the decklid 4 and the surface 12 of the fascia. If the gap or margin 22 is not acceptable (i.e. the gap 22 is not within a predefined range of acceptable values), the worker can then open the decklid 4 and adjust the stop or cinched position C of striker member 28 as shown at step 96. The adjustment of the striker stop position is accomplished by moving switch 84 (FIG. 3) as discussed above. Specifically, the set screw 88 may be loosened, and the first switch 84 may be moved, and the set screw 88 may be tightened to secure the switch 84 in the new, adjusted position. A user can measure the gap 22 prior to adjustment, and compare the size of the measured gap to the size of the desired or target gap to determine the distance that switch 84 must be moved to provide the correct fully cinched position C for movable striker member 28. For example, the target or desired gap 22 may be 2 mm or 3 mm. If the desired/target gap is 3 mm, and the measured gap is 6 mm, the position of switch 84 can be adjusted to reduce the gap by 3 mm.

It will be understood that the geometry of the links 64 and 72, as well as the configuration of the slot 50 of rack 46, will affect the relationship between the distance rack 46 moves and the distance movable striker member 28 moves, and this difference may be taken into account when adjusting the position of switch 84. For example, the geometry of the links 64 and 72 may cause movable striker member 28 to move 2 mm for every 1 mm of linear movement of rack member 46. In this case, if the fully cinched position C of striker member 28 needs to be adjusted 3 mm, the location of switch 84 would be adjusted by 1.5 mm. In the illustrated example, the switches 84 and 86 are adjustably mounted utilizing set screws 88 and 90. However, as discussed below, the switches 84 and 86 may be adjustably mounted utilizing a detent connection.

Referring again to FIG. 9, after adjustment of the position of the switch, the decklid 4 is again closed, and the gap or margin 22 is again measured. If the gap or margin 22 is not correct (i.e. the size of the gap or margin 22 falls outside of a predefined acceptable range), the position of switch 84 is again adjusted at step 96, and the adjustment process is repeated until the gap or margin 22 is acceptable. Once the gap or margin 22 is set at an acceptable value, the decklid 4 is opened, and a bracket and carpet is utilized to cover the striker actuator 25 as shown at step 98, and the vehicle is then moved to the next station as shown at step 100.

Figure 11:
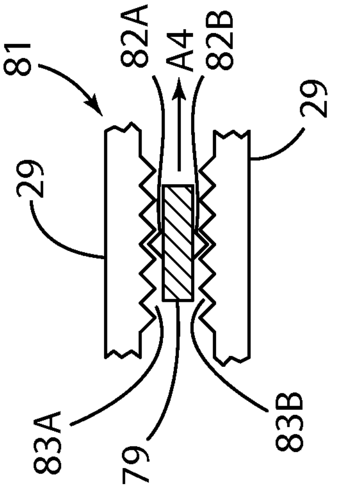
FIG. 11 is a cross sectional view of the detent mechanism taken along the line XI-XI of FIG. 10.
Figure 10:
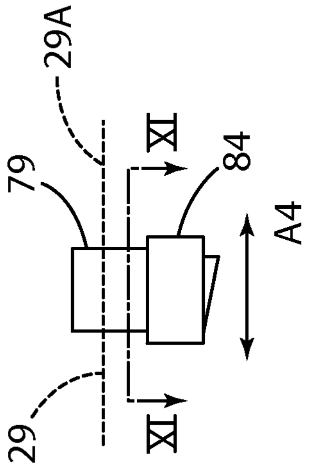
FIG. 10 is a partially schematic view of an adjustable switch including a detent mechanism.

With further reference to FIGS. 10 and 11, switch 84 may be adjustably mounted to the structure 29 utilizing a detent mechanism 81. Specifically, switch 84 may include an extension 79 that protrudes from surface 29A of structure 29. The extension 79 may include teeth or protrusions 82A and 82B that engage teeth 83A and 83B that are mounted to the support structure 29 to thereby permit movement of switch 84 relative to support structure 29 as indicated by the arrow A4. The teeth 83A and 83B may be spaced apart by a predefined distance corresponding to a predetermined change in the fully cinched position P of striker member 28. For example, the teeth 83A and 83B may be spaced apart from one another by a distance corresponding to a 0.5 mm change in the location of striker 28 when striker 28 is in a fully cinched position C. Thus, a user can adjust the position of switch 84 by pushing on tab 79 to change the position of switch 84 by a required number of "clicks" or detents to change/adjust the fully cinched position P of striker member 28.

Figure 12:
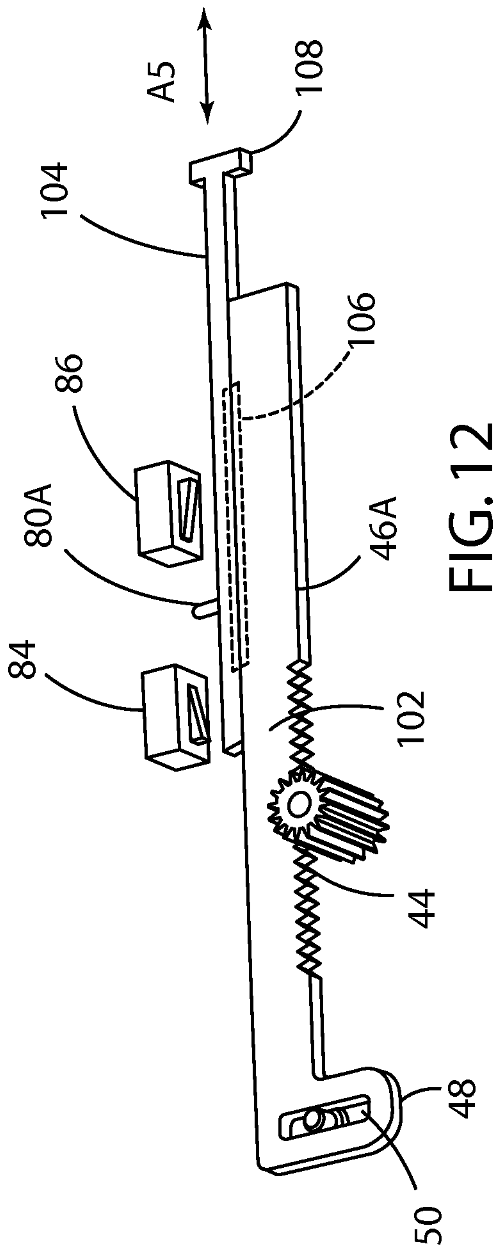
FIG. 12 is a partially schematic view of a rack member according to another aspect of the present invention.

With further reference to FIG. 12, a rack 46A according to another aspect of the present invention comprises a two piece assembly having a first component 102 with teeth 44 and a slot 50 at end 48 that are substantially similar to the corresponding features discussed above in connection with FIG. 4. The rack 46A includes a tab or second member 104 that is movably interconnected to the first component 102 by a detent connection 106 shown schematically in dashed lines in FIG. 12. The end portion 108 of tab member 104 can be grasped by a user and shifted relative to the first component 102 as indicated by the arrow "A5" to thereby change the position of protrusion 80A relative to first component 102 of rack member 46A. This adjustment of the position of protrusion 80A changes the relative position of the teeth 44 relative to the switches 84 and 86, thereby adjusting the presented and fully cinched positions of striker member 28. If the rack member 46A is utilized, a user can shift the location of tab 104 at step 96 (FIG. 9) to adjust the margin or gap 22 as required.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. An adjustable latch assembly for decklids of vehicles, the latch assembly comprising:

a decklid including a latch mechanism having a movable latch member configured to releasably engage a striker;

an adjustable striker assembly configured to be mounted to a vehicle adjacent a deck opening, the adjustable striker assembly including a support structure and a striker member movably mounted to the support structure for movement relative to the support structure between a presented position and a fully cinched position, wherein the striker member is configured to retain the decklid in a partially closed position relative to a deck opening when the striker member is in the presented position, and wherein the striker member is configured to retain the decklid in a fully closed position when the striker member is in the fully cinched position;

a powered actuator operably connected to the striker member to provide powered movement of the striker member from the presented position to the fully cinched position; and wherein:

the fully cinched position of the striker member is adjustable such that the fully closed position of the decklid relative to a decklid opening can be adjusted.

2. The adjustable latch assembly of claim 1, including:

at least one switch that is actuated when the striker member is in the fully cinched position.

3. The adjustable latch assembly of claim 2, wherein:

the switch can be moved relative to the support structure to adjust the fully cinched position of the striker member relative to the support structure.

4. The adjustable latch assembly of claim 3, including:

a rack member;

linkage operably connecting the rack member to the striker member such that movement of the rack member between extended and retracted positions causes the striker member to move between its presented and fully cinched positions; and wherein:

the powered actuator linearly shifts the rack member relative to the first switch.

5. The adjustable latch assembly of claim 4, wherein:

the rack member comprises a plurality of teeth; and including:

a gear having teeth engaging the teeth of the rack member; and wherein:

the powered actuator comprises an electric motor that rotates the gear and causes the rack member to move linearly.

6. The adjustable latch assembly of claim 5, wherein:

the switch comprises a first switch that is adjustably mounted to the support structure;

and including:

a second switch mounted to the support structure; and wherein:

the rack engages the first switch when the rack is in its retracted position such that the retracted position of the rack can be adjusted by adjusting a position of the first switch.

7. The adjustable latch assembly of claim 6, including:

a locking member that retains the first switch in a selected position.

8. The adjustable latch assembly of claim 7, wherein:

the locking member comprises a threaded member that can be tightened to secure the first switch in a selected position.

9. The adjustable latch assembly of claim 1, wherein:

the decklid defines an elongated lower edge;

the support structure comprises a vehicle structure defining an elongated edge of a deck opening; and wherein:

the elongated lower edge of the decklid is disposed adjacent the elongated edge of the deck opening when the striker member is in the fully cinched position to define a gap between the edges, and wherein the gap is less than about 3.0 mm.

10. The adjustable latch assembly of claim 3, wherein:

the switch is movably supported by a detent structure that permits adjustment of the position of the switch in discrete increments.

11. The adjustable latch assembly of claim 10, wherein:

the switch can be moved linearly, and the detents are spaced at 0.5 mm increments whereby the fully cinched position of the striker member can be adjusted in 0.5 mm increments.

12. A method of setting a gap between a decklid and a vehicle surface, the method comprising:

providing a powered cinching latch assembly including a releasable latch mechanism and a striker assembly having a powered actuator that moves a striker member between a presented position and a cinched position;

adjusting the cinched position of the striker to provide a gap between an edge of the decklid and the vehicle surface that fulfills predetermined criteria.

13. The method of claim 12, including:

closing the decklid;

measuring a gap between an edge of the decklid and a vehicle surface;

determining a difference between the measured gap and an acceptable gap; and adjusting the cinched position of the striker by an amount required to provide an acceptable gap.

14. The method of claim 13, wherein:

the acceptable gap is less than about 4.0 mm.

15. The method of claim 13, including:

closing the decklid after adjusting the cinched position of the striker; and measuring the gap between an edge of the decklid and a vehicle surface to verify that the measured gap is acceptable according to predefined criteria.

16. The method of claim 12, wherein:

adjusting the cinched position of the striker includes moving a switch that is actuated when the striker reaches the cinched position.

17. The method of claim 12, wherein:

the decklid includes a generally linearly horizontal lower edge defining a first gap relative to a first portion of a vehicle structure, and upwardly extending side edges that define second gaps relative to a second portion of a vehicle structure, and wherein a dimension of the first and second gaps is substantially equal after adjustment of the location of the cinched position of the striker to provide a substantially uniform appearance.

* * * * *